March 14, 1939.  J. L. L. A. A. MOULET  2,150,393
MEANS FOR PACKING AND LUBRICATING ROTARY SHAFTS
Filed June 13, 1938   2 Sheets-Sheet 1

JEAN LOUIS LÉON ALEXANDRE ALBERT MOULET
INVENTOR

By Otto Munk
His Atty.

March 14, 1939.    J. L. L. A. A. MOULET    2,150,393
MEANS FOR PACKING AND LUBRICATING ROTARY SHAFTS
Filed June 13, 1938    2 Sheets-Sheet 2
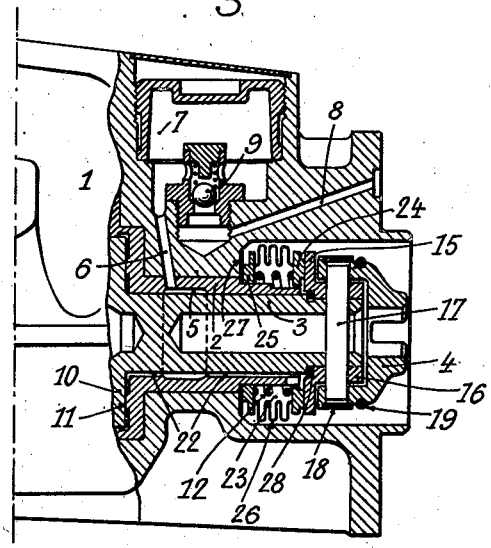
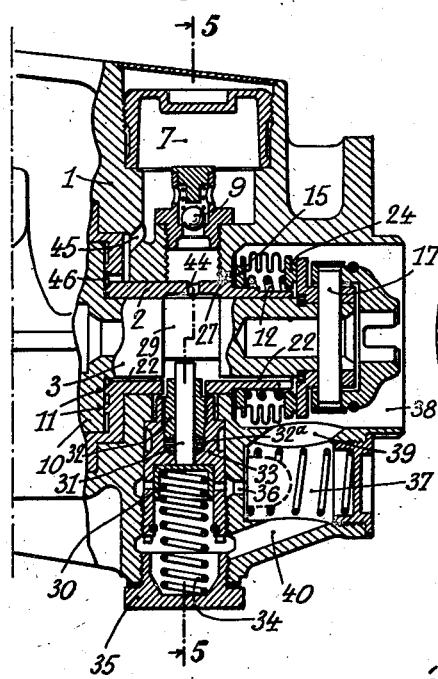
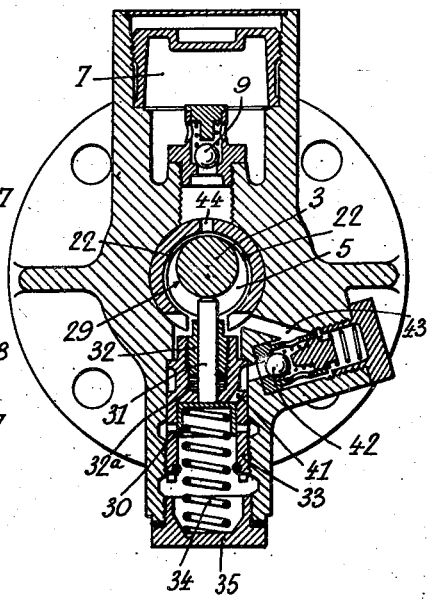
JEAN LOUIS LÉON ALEXANDRE ALBERT MOULET
INVENTOR
By Otto Munk
HIS ATTY.

Patented Mar. 14, 1939

2,150,393

UNITED STATES PATENT OFFICE 2,150,393

MEANS FOR PACKING AND LUBRICATING ROTARY SHAFTS

Jean Louis Léon Alexandre Albert Moulet, Boulogne-sur-Seine, France, assignor to Martin Moulet & Cie, Oullins, Rhone, France Application June 13, 1938, Serial No. 213,373
In France December 14, 1937

7 Claims. (Cl. 308—36.3)

The present invention relates to means for ensuring the lubrication of and preventing leakage around a rotary shaft extending through the wall of a casing containing a fluid under pressure. The invention is more particularly intended to be applied to shafts of pumps, and still more particularly to shafts of pumps for the fuel supply of engines.

In a known construction, there is provided for this purpose, between a shoulder of the rotary shaft and the inner wall of the casing or of the bushing supporting the shaft journal, a thrust bearing forming a joint against which said shoulder is urged longitudinally by a spring which bears against the casing. On the other hand, a chamber supplied with oil under pressure is formed in the journal-bearing, and it provides for the lubrication of this bearing, while the said thrust-bearing separates the lubricating oil from the pumped fluid.

This arrangement has a drawback, consisting in that the oil pressure, which is effective as far as the joint formed by said thrust bearing, creates upon the shaft a thrust which takes place in the contrary direction to the pressure exerted by the spring. In consequence, when this oil-pressure is built up, it will reduce and may even overcome the pressure of the shoulder of the shaft upon said thrust-bearing, and this may reduce the non-leaking effect and cause the flow of a great quantity of oil into the pumped fluid. This drawback may be eliminated by increasing the force of the reaction spring; but if for any reason the oil pressure should diminish or should cease to act, the great pressure exerted by the spring, while the efficiency of the lubrication is reduced or even nil, may cause a jamming of the parts subject to friction and may occasion serious damage. This may particularly occur during the starting, when the oil has not had time to cover the parts under friction.

In other known constructions, the thrust joint is formed between a shoulder of the shaft and the outer wall of the casing, an oil chamber being provided in an extension of the casing, and the spring resting upon the cover of the oil chamber. In this case, the oil pressure is exerted upon the cross-section of the shaft, and is entirely added to the pressure of the spring.

However, in a great number of mechanisms, the lubrication takes place at high pressure, and this may give rise to an excessive thrust upon the thrust bearing. On the other hand, in this case, the portion of the shaft which is situated beyond the shoulder and is located in the bushing, will receive no lubrication, and will thus be subject to jamming or to rapid wear.

The means for lubricating and packing rotary shafts according to the present invention obviate the various drawbacks above mentioned and are characterized by the fact that the shaft comprises, on either side of an oil chamber provided in the shaft-journal bearing, two shoulders which are pressed in a non-leaking manner against two thrust bearings which are secured to the casing or to the bushing supporting the shaft journal, one of these thrust bearings, at least, being elastic, the said shoulders being so arranged that the oil-pressure will exert forces in contrary directions upon these two shoulders.

In these conditions, when the oil fills said oil or lubricant chamber, thus providing for the lubrication of the shaft, its pressure is exerted at the same time but in contrary directions upon the two shoulders of the rotary shaft.

By a suitable construction, it will thus be an easy matter to make the surfaces upon which the oil-presure is exerted either equal or one of them greater than the other by a determined amount.

According to a further feature of the invention, the access of the oil to the two shoulders is facilitated by grooves leading to either side, which are formed in said bushing and also serve as lubricating grooves.

According to one embodiment, a spring or like elastic device which bears against the casing or the bushing urges in an elastic manner a piston or like device against one shoulder of the shaft, with which shoulder the said piston or like device forms a non-leaking joint, and, under the action of the elastic thrust thus exerted on the shaft, the other shoulder of the said shaft is urged directly against the cooperating surface of the casing or the bushing.

Preferably, it is the shoulder of the shaft which is situated on the pressure fluid side which is in direct contact with the corresponding surface of the casing or the bushing, while the piston or like device urged by the spring or other elastic device bears against the other shoulder situated at the end of the casing.

According to a further feature of the invention, the supply with oil under pressure is ensured through the medium of a pressure storage accumulator which is closed by a clack-valve adapted to prevent the return of oil towards the source of oil under pressure. The lubricating chamber is thus maintained under pressure even at rest when the discharge of oil from the source of oil is stopped.

Obviously, the source of oil under pressure may be either independent of the means according to the invention, or may form part of these means.

The invention consists further of the various applications of the said lubricating and packing means for rotary shafts, and particularly of the pumps for liquid fuel or the like, provided with such means.

Further characteristics will be set forth in the following description.

In the accompanying drawings, which are given solely by way of example:

Fig. 3 is a partial section of a mechanism according to the invention, applied to a fuel feed pump for an engine, in which mechanism the piston which is subject to the oil-pressure is an elastic piston consisting of a flexible bellows, the source of the oil being independent of the lubricating and packing means.

Fig. 4 is a vertical lengthwise section of a modification, in which the source of oil under pressure forms part of the mechanism itself.

Fig. 5 is a vertical cross-section on the line 5—5 of Fig. 4.

Figure 1:
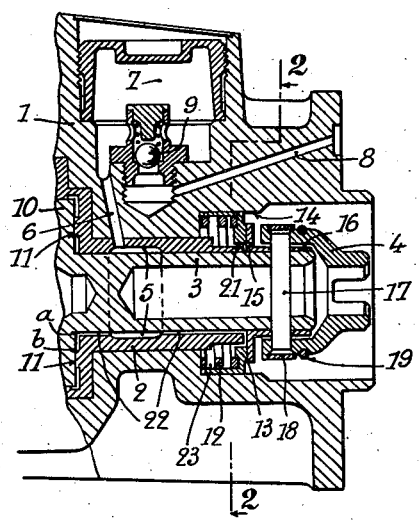
Fig. 1 is a section, on the axis of the rotary shaft, of a mechanism according to the invention, the source of oil under pressure being independent of the lubricating and packing means.
Figure 2:
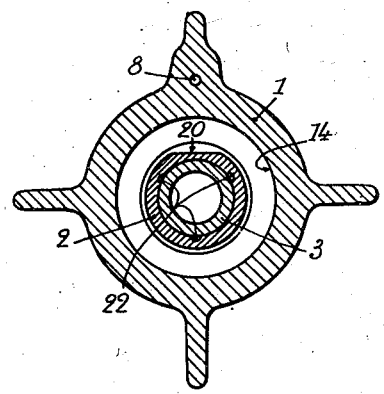
Fig. 2 is a partial cross-section of the device, on the line 2—2 of Fig. 1.

In the embodiment shown in Figs. 1 and 2, in the casing 1 which contains, on the left of the figure, a fluid under pressure, is mounted a bushing 2 rotatably supporting a shaft 3 which is driven, for instance, by a coupling member 4 carrying a driving slot. The bushing 2 is provided with a chamber 5 which communicates through a passage 6, with a closed cavity 7 constituting a pressure accumulator. The said cavity is connected with a source of oil under pressure by a channel 8, through a valve 9 which, in the embodiment illustrated, consists of a spring pressed ball.

The rotary shaft 3 comprises a shoulder 10 urged against an annular thrust bearing 11 provided at the end of the bushing 2. The shaft 3 is urged against said thrust bearing 11 by a spring 12 which is compressed between the casing 1 and a member 13 which forms a piston and is slidable in a bore 14 formed in the casing 1, concentrically with the axis of the rotary shaft. The piston 13 is urged by the spring 12 against a flange 15, which forms a thrust shoulder, of a sleeve 16 which is fitted upon the shaft and is secured to the latter for instance by a pin 17 which also secures the coupling member 4. The pin 17 is held in place by a hoop 18 which is held in place longitudinally by a ring 19 consisting of piano wire and inserted in a groove in member 4. The piston 13 is mounted on the end of the bushing 2. On this end is formed a flat part 20 (Fig. 2), and the axial aperture 21 in the end of the piston 13 comprises a similar part, so that the said piston may slide longitudinally but will not be rotated by the shoulder 15 with which it is in contact and which turns with the shaft 3.

Suitable grooves 22 are provided at intervals in the said bushing, between the chamber 5 and the shoulders 10 and 15 of the shaft 3. A sufficient clearance gap is provided between the aperture 21 of the piston and the bushing 2 in order that the oil may flow towards the chamber 23 containing the spring 12.

It will be noted that the spring 12, which bears against the casing 1, will press upon the shoulder 15 through the medium of the piston 13, thereby urging the shoulder 10 of the shaft 3 against the thrust bearing 11.

The oil under pressure arriving through the channel 8 enters the chamber 7 by raising the valve 9, and then passes through the channel 6 into the chamber 5. From here, it is distributed on the one hand around the shaft as far as the thrust bearing 11, and on the other hand around the shaft as far as the piston 13, through the oil grooves 22 formed in the bushing, so that the shaft 3 is properly lubricated, while at the same time the pressure of the oil is rapidly transmitted to the shoulders 10 and 15 of the rotary shaft 3.

It will be observed that the oil pressure acts simultaneously, on the one hand upon the annular surface $ab$ of the shoulder 10 and on the other hand, upon the annular central part of the shoulder 15 and on the piston 13, within the chamber 23 formed between the end of the bore 14 of the casing and the piston 13, which latter presses in a non-leaking manner upon the shoulder 15.

If the two surfaces receiving the oil pressure have equal areas, there will be evidently an equilibrium, and the oil pressure will not change the conditions of operating which would exist with the use of the reaction spring 12 alone. This case may be of interest when the oil pressure is not constant.

If a predominance should exist in favour of the auxiliary shoulder 15, located on the side opposite the shoulder 10 forming a joint with the liquid or other pumped fluid contained in the casing 1, the oil pressure will cause an increase of the pressure on the main shoulder 10, thus increasing the sealing effect at this joint and effectively preventing all leakage of the pumped fluid, to the exterior, as well as all excessive flow of oil into the pumped fluid. This is the case which is most generally used for liquid fuel pumps.

On the contrary, if a predominance should exist in favour of the main shoulder 10 forming a joint with the pumped fluid, the oil pressure will cause the flow of a certain quantity of lubricant into the pumped fluid, which in some cases may be desirable.

It may be further observed that as the additional thrust upon the shaft 3 resulting from this arrangement is produced by the differential action of the oil pressure upon two surfaces, this can be determined with great accuracy and the effect of the oil pressure upon the sealing action of the principal joint (10, 11) exactly regulated.

As already stated, it is possible, according to the case, to provide for this in such a way as to obtain the flow of a determined quantity of oil into the pumped fluid, or on the contrary, to establish the pressure in such a way that the consumption of oil will be reduced to the minimum compatible with a proper operation.

This arrangement further makes it possible to use, for urging the shaft 3 against the main thrust bearing 11, a spring 12 which is as weak as will be necessary in order to prevent all jamming when the apparatus is started.

It will be further observed that owing to this construction, there is maintained between two contacting bearing surfaces (10, 11) (13, 15) and the valve 9 of the accumulator a cushion of oil nder pressure. If the pressure of this oil exceeds the pressure of the pumped fluid, it is vident that no leakage of pumped fluid can take place during operation of the pump. According to the resulting pressure which is exerted, as above set forth, upon the thrust bearing 11 between the oil and the pumped fluid, a greater or less amount of oil will pass across this thrust bearing 11 and will thus lubricate it.

The joint between the piston 13 and the shoulder 15 also requires a certain quantity of oil, which returns to the driving mechanism exterior to the pump. The source of the oil will constantly compensate the oil thus consumed.

At rest no consumption of oil will take place, and the oil cushion will be maintained for a very long time between the contact surfaces (10, 11) (13, 15) and the valve 9 of the accumulator.

The sealing will thus be permanently ensured in an effective manner.

Fig. 3 illustrates a further embodiment of the invention, applied to a pump for the fuel supply of an engine.

In this embodiment the accumulator 7 is supplied with oil through the channel 8 from the lubricating pump of the engine itself. The shaft 3 of the fuel pump comprises a shoulder 10 which is pressed by a spring 12 against an annular thrust bearing 11 located at the end of the bushing 2.

In this modified form of construction, the cylindrical piston of the preceding device is replaced by an elastic piston which serves the same purpose and consists of two washers 24 and 25 which are connected together in a tight manner by a flexible membrane or bellows 26 which is capable of being deformed elastically in the longitudinal direction. The washer 25 bears upon the casing 1 through the medium of a fixed packing ring 27. The washer 24 bears, by an annular surface, upon the flanged part 15 of a sleeve 16 which serves as a thrust bearing and is secured to the rotatable shaft by a pin 17 which also secures the coupling member 4. The spring 12 is compressed between the washers 24 and 25. The washer 24 is centered upon the end of the bushing 2 which as in the preceding example has a flat part, in order that the end of the elastic piston may slide freely in the longitudinal direction, but cannot be rotated by the stop 15 which turns with the shaft 3.

Owing to this arrangement, the elastic piston, which is a relatively fragile piece, will not be subjected to any torsional stress. On the other hand, it is only subject to very slight longitudinal deformations. For this reason, its preservation is entirely ensured.

A packing ring 28 is mounted between the stop 16 and the shaft 3.

The two shoulders and their cooperating thrust bearings are designed in such manner that the effective area upon which the oil pressure is exerted on the side next the shoulder 15 will be slightly greater than the effective area upon which the oil pressure is exerted on the side next the shoulder 10.

The oil under pressure which is supplied, as above mentioned, to the chamber 5, produces a thrust which is exerted simultaneously upon the two shoulders. Owing to the difference between the effective areas, the resulting thrust takes place in the same direction as the pressure exerted by the spring 12, and this furthers the sealing effect of the joint (10, 11). The cushion of oil under pressure is effectively maintained between the joints (10, 11) (15, 24), and owing to the accumulator 7 and the valve 9, it continues its action after the stopping of the engine.

Figs. 4 and 5 represent a modified form of construction in which the source of the oil under pressure forms part of the mechanism itself, and consists of an auxiliary oil pump which supplies with oil the chamber 5 for the lubrication of the bearing 2 of the shaft 3.

In this embodiment, the shaft 3 comprises an eccentric part 29 forming a cam which acts upon a piston 30 by means of a rod 31 which is slidable in a stuffing-box 32ᵃ and a ring 32. The said ring is itself secured to the end of the member 33 which forms the cylinder of the oil-pump and is mounted in the casing 1. A coil spring 34 is compressed between the piston 30 and a cap 35 which is screwed into the casing. The cylinder 33 communicates through a channel 36 with a recess 37 which is formed in the casing and serves to collect lubricant coming from the engine casing through an aperture 38 and an orifice 39. A return delivery channel 40 prevents any compression of the oil below the piston.

Above the piston 30, the cylinder 33 communicates through a passage 41, a valve 42, and a passage 43 (Fig. 5), with the chamber 5. This chamber 5, in turn, communicates with the accumulator 7 through the orifice 44 and the valve 9.

The accumulator 7 communicates through a channel 45 with an annular groove 46 which is located between two concentric bearing surfaces 11 of the bushing 2.

It will be observed that when the shaft 3 is rotated, the cam 29 will cause a downward movement of the piston 30, thus compressing the spring 34. When at the dead centre of its downward stroke, the piston will uncover the orifice of the channel 36, thus allowing the oil to fill the cylinder 33 above the piston. The discharge stroke then takes place by the action of the spring 34 and through the channel 41, the valve 42 and the channel 43, into the chamber 5 of the bearing. This discharge takes place under a substantially constant pressure the value of which is determined by the force of the spring 34. From the chamber 5, the oil is circulated through the grooves 22 to the bearing surface 11 and to the bearing surface of the elastic piston. On the other hand, this oil enters the accumulator 7 by lifting the valve 9, and the oil from the said accumulator enters the groove 46 provided in the bearing surface 11.

Obviously, the invention is not limited to the embodiments herein described and represented, which are given solely by way of example.

Having now described my invention what I claim as new and desire to secure by Letters Patent is:

1. In an apparatus including a casing adapted to contain a fluid under pressure, the combination with a rotary shaft extending through a wall of said casing and a bearing provided in said wall for rotatably supporting said shaft, of means for packing and lubricating said shaft including two thrust-bearings facing opposite directions and arranged on either side of said wall in liquid tight relation with the inner and outer surfaces of said wall, respectively, two shoulders on said shaft in spring-pressed engagement with said thrust-bearings and a source of lubricant under pressure adapted to deliver lubricant into the clearance gap between said bearing and said shaft.

2. In an apparatus including a casing adapted to contain a fluid under pressure, the combination with a rotary shaft extending through a wall of said casing and a bearing provided in said wall for rotatably supporting said shaft, of means for packing and lubricating said shaft including two thrust-bearings facing opposite directions and arranged on either side of said wall in liquid tight relation with the inner and outer surfaces of said wall, respectively, two shoulders on said shaft in spring-pressed engagement with said thrust-bearings, said bearing having an annular groove in its inner surface and longitudinal lubricating grooves extending from said annular groove and on either side thereof as far as the ends of said bearing, and a source of lubricant under pressure adapted to deliver lubricant into said annular groove.

3. In an apparatus including a casing adapted to contain a fluid under pressure, the combination with a rotary shaft extending through a wall of said casing and a bearing provided in said wall for rotatably supporting said shaft, of means for packing and lubricating said shaft including a thrust bearing formed on one side surface of said wall, two shoulders on said shaft located on either side of said bearing, one of said shoulders engaging said thrust-bearing, a longitudinally movable annular member located between said wall and the other of said shoulders and having a flat radial bearing surface adapted to engage said other shoulder, sealing means between said annular member and the other side surface of said wall for providing liquid tightness therebetween in all the longitudinal positions of said annular member, spring means adapted to urge said annular member toward said other shoulder whereby said shaft is bodily subjected to a longitudinal thrust also pressing said one shoulder against the first mentioned thrust-bearing, and a source of lubricant under pressure adapted to deliver lubricant into the clearance gap between said bearing and said shaft.

4. In an apparatus including a casing adapted to contain a fluid under pressure, the combination with a rotary shaft extending through a wall of said casing and a bearing provided in said wall for rotatably supporting said shaft, of means for packing and lubricating said shaft including a thrust-bearing formed on the inner surface of said wall, two shoulders on said shaft located on either side of said bearing, one of said shoulders engaging said thrust-bearing, the outer surface of said wall being provided with a cylindrical bore coaxial with said shaft, an annular piston slidably mounted in said bore between the other of said shoulders and the outer surface of said wall and having a flat annular bearing surface adapted to engage said other shoulder and lateral walls forming a tight joint with the walls of said bore, a spring between said annular piston and the outer surface of said wall, adapted to urge said annular piston against said other shoulder, lubricating grooves in said bearing and a source of oil under pressure adapted to deliver lubricant into said lubricating grooves.

5. In an apparatus including a casing adapted to contain a fluid under pressure, the combination with a rotary shaft extending through a wall of said casing and a bearing provided in said wall for rotatably supporting said shaft, of means for packing and lubricating said shaft including a thrust-bearing formed on one of the side surfaces of said wall, two shoulders on said shaft having their contact surfaces positioned opposite one another and on either side of said wall and one of said shoulders engaging said thrust-bearing, two washers, a cylindrical bellows connecting together said two washers, and arranged so that one of said washers engages the other of said shoulders and the other of said washers engages in non-leaking conditions the other side surface of said wall, a spring means enclosed in said bellows for urging said two washers apart, lubricating grooves in said bearing and a source of lubricant under pressure adapted to deliver lubricant into said grooves.

6. In an apparatus including a casing adapted to contain a fluid under pressure, the combination with a rotary shaft extending through a wall of said casing, of a bushing mounted in said wall for rotatably supporting said shaft and having a flanged portion on its inner end and an outer end portion extending beyond the outer surface of said wall, a thrust-bearing surface on the inner face of said flanged portion, two shoulders on said shaft, one adapted to engage said thrust-bearing surface and the other adjacent the outer end of said bushing, an annular member encircling said end portion of the bushing, cooperating means on said end portion and on said annular member for preventing rotation of said annular member while permitting longitudinal movement thereof relatively to said bushing, said annular member having a flat radial bearing surface adapted to engage said other shoulder, sealing means between said annular member and the outer surface of said wall for providing liquid tightness therebetween in all the longitudinal positions of said annular member, spring means adapted to urge said annular member toward said other shoulder, lubricating grooves in said bushing and a source of lubricant under pressure adapted to deliver lubricant into said lubricating grooves.

7. In an apparatus including a casing adapted to contain a fluid under pressure, the combination with a rotary shaft extending through a wall of said casing and a bearing provided in said wall for rotatably supporting said shaft, of means for packing and lubricating said shaft including two thrust-bearings facing opposite directions and arranged on either side of said wall in liquid tight relation with the inner and outer surfaces of said wall, respectively, two shoulders on said shaft in spring-pressed engagement with said thrust-bearings, lubricating grooves in said bearing, a source of oil under pressure, an oil accumulator having an oil inlet passage connected to said source of oil under pressure, and an oil outlet passage leading to said lubricating grooves and a clack-valve in said oil-inlet passage for preventing the return of oil to said source of oil under pressure when the latter is at rest.

JEAN LOUIS LÉON ALEXANDRE
ALBERT MOULET.